(12) United States Patent
Sugita

(10) Patent No.: US 10,262,799 B2
(45) Date of Patent: Apr. 16, 2019

(54) MULTILAYER CERAMIC CAPACITOR

(71) Applicant: Murata Manufacturing Co., Ltd., Nagaokakyo-shi, Kyoto-fu (JP)

(72) Inventor: Hiroaki Sugita, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/788,838

(22) Filed: Oct. 20, 2017

(65) Prior Publication Data

US 2018/0114644 A1  Apr. 26, 2018

(30) Foreign Application Priority Data

Oct. 26, 2016  (JP) .................................. 2016-209454

(51) Int. Cl.

| H01G 4/12 | (2006.01) |
|---|---|
| H01G 4/30 | (2006.01) |
| H01G 4/008 | (2006.01) |
| H01G 4/012 | (2006.01) |
| H01G 4/232 | (2006.01) |
| H01G 4/248 | (2006.01) |

(52) U.S. Cl.
CPC ........... H01G 4/2325 (2013.01); H01G 4/008 (2013.01); H01G 4/12 (2013.01); H01G 4/232 (2013.01); H01G 4/30 (2013.01); *H01G 4/0085* (2013.01); *H01G 4/012* (2013.01); *H01G 4/248* (2013.01)

(58) Field of Classification Search
CPC ...... H01G 4/2325; H01G 4/008; H01G 4/012; H01G 4/12; H01G 4/30; H01G 4/248

USPC ...................................................... 361/306.3
See application file for complete search history.

(56) References Cited

U.S. PATENT DOCUMENTS

| 2004/0125543 | A1* | 7/2004 | Hirano | H01G 9/012 |
| | | | | 361/523 |
| 2008/0128860 | A1* | 6/2008 | Sawada | H01G 4/232 |
| | | | | 257/536 |
| 2013/0208401 | A1* | 8/2013 | Shirakawa | H01G 13/06 |
| | | | | 361/305 |
| 2015/0036264 | A1* | 2/2015 | Morita | C04B 35/4682 |
| | | | | 361/321.4 |
| 2015/0114700 | A1* | 4/2015 | Park | H01G 4/012 |
| | | | | 174/260 |
| 2016/0099110 | A1* | 4/2016 | Lee | H01G 4/30 |
| | | | | 361/301.4 |

FOREIGN PATENT DOCUMENTS

JP  11-162771 A  6/1999

* cited by examiner

*Primary Examiner* — Michael P McFadden
(74) *Attorney, Agent, or Firm* — Keating & Bennett, LLP

(57) ABSTRACT

A multilayer ceramic capacitor includes a multilayer body and first and second outer electrodes that include first and second base electrode layers, respectively, first and second electroconductive resin layers, respectively, and first and second plating layers, respectively. The first and second base electrode layers are only located on the end surfaces of the multilayer body. The first and second electroconductive resin layers reach portions of the surfaces of the primary surfaces and portions of the surfaces of the lateral surfaces of the multilayer body. The first and second plating layers cover at least a portion of the base electrode layers and at least a portion of the electroconductive resin layers.

20 Claims, 6 Drawing Sheets

MULTILAYER CERAMIC CAPACITOR

CROSS REFERENCE TO RELATED APPLICATIONS

This application claims the benefit of priority to Japanese Patent Application No. 2016-209454 filed on Oct. 26, 2016. The entire contents of this application are hereby incorporated herein by reference.

BACKGROUND OF THE INVENTION

1. Field of the Invention

The present invention relates to a multilayer ceramic capacitor.

2. Description of the Related Art

In recent years, ceramic electronic components, represented by multilayer ceramic capacitors, have come to be used in harsher environments than before.

For example, multilayer ceramic capacitors used in mobile equipment, such as mobile phones and portable music players, are expected to withstand impact from a fall. Specifically, it is necessary to ensure that the multilayer ceramic capacitors neither detach from the substrate on which they are mounted nor crack even if the equipment takes impact from a fall.

As for multilayer ceramic capacitors used in in-car equipment, such as ECU (electronic control units), they are expected to withstand impact from thermal cycles. Specifically, it is necessary to ensure that the multilayer ceramic capacitors do not crack even if exposed to a flexural stress resulting from thermal expansion and contraction of the substrate on which they are mounted caused by thermal cycles.

In response to these expectations, it has been proposed to use a thermosetting electroconductive resin paste as material for outer electrodes of multilayer ceramic capacitors. For example, in Japanese Unexamined Patent Application Publication No. 11-162771, an epoxy-based thermosetting resin layer is formed between electrode and Ni plating layers as a measure to ensure that the multilayer body does not crack even in a harsh environment.

However, designs in which an epoxy-based thermosetting resin layer is formed between electrode and Ni plating layers as in Japanese Unexamined Patent Application Publication No. 11-162771 can be disadvantageous in that the contact resistance between the epoxy-based thermosetting resin and Ni plating layers can be high, and that the equivalent series resistance (hereinafter referred to as "ESR") can be high. Furthermore, since the epoxy-based thermosetting resin layer is formed to cover the entire electrode layer as in Japanese Unexamined Patent Application Publication No. 11-162771, these designs can be disadvantageous in that the ESR is high for this reason as well, besides that the end-face thickness of the outer electrode is large.

SUMMARY OF THE INVENTION

Accordingly, preferred embodiments of the present invention provide multilayer ceramic capacitors with reduced ESR despite the presence of an electroconductive resin layer in the outer electrodes of the multilayer ceramic capacitor.

According to a preferred embodiment of the present invention, a multilayer ceramic capacitor includes a multilayer body, first and second inner electrodes, and first and second outer electrodes. The multilayer body includes a stack of multiple dielectric layers and includes first and second primary surfaces opposite each other in the direction of stacking, first and second lateral surfaces opposite each other in the width direction, the direction perpendicular or substantially perpendicular to the direction of stacking, and first and second end surfaces opposite each other in the length direction, the direction perpendicular or substantially perpendicular to the direction of stacking and width direction. The first and second inner electrodes are stacked alternately with multiple dielectric layers therebetween, each first inner electrode including an exposed portion on the first end surface and each second inner electrode including an exposed portion on the second end surface. The first outer electrode is electrically coupled to the first inner electrodes and located on the first end surface side, and the second outer electrode is electrically coupled to the second inner electrodes and located on the second end surface side. In this multilayer ceramic capacitor, the first outer electrode includes a first base electrode layer including electroconductive metal and glass components, a first electroconductive resin layer including thermosetting resin and metal components, and a first plating layer, and the second outer electrode includes a second base electrode layer including electroconductive metal and glass components, a second electroconductive resin layer including thermosetting resin and metal components, and a second plating layer. The first base electrode layer is only located on the surface of the first end surface, and the second base electrode layer is only located on the surface of the second end surface. The first electroconductive resin layer extends, to be connected to the first base electrode layer, from an end portion of the first base electrode layer to portions of the surfaces of the first and second primary surfaces and portions of the surfaces of the first and second lateral surfaces, and the second electroconductive resin layer extends, to be connected to the second base electrode layer, from an end portion of the first base electrode layer to portions of the surfaces of the first and second primary surfaces and portions of the surfaces of the first and second lateral surfaces. The first plating layer is on the surface of the first base electrode layer and the surface of the first electroconductive resin layer, and the second plating layer is on the surface of the second base electrode layer and the surface of the second electroconductive resin layer.

In a multilayer ceramic capacitor according to a preferred embodiment of the present invention, the first base electrode layer covers at least the exposed portions of the first inner electrodes, the second base electrode layer covers at least the exposed portions of the second inner electrodes, the first electroconductive resin layer extends, to be connected to the first base electrode layer, from an end portion of the exposed portions of the first inner electrodes, exposed on the first end surface, to portions of the surfaces of the first and second primary surfaces and portions of the surfaces of the first and second lateral surfaces, and the second electroconductive resin layer extends, to be connected to the second base electrode layer, from an end portion of the exposed portions of the second inner electrodes, exposed on the second end surface, to portions of the surfaces of the first and second primary surfaces and portions of the surfaces of the first and second lateral surfaces.

In a multilayer ceramic capacitor according to a preferred embodiment of the present invention, the first electroconductive resin layer extends, to be connected to the first base electrode layer, from an end portion of the first base electrode layer to portions of the surfaces of the first and second primary surfaces and portions of the surfaces of the first and second lateral surfaces, and the second electroconductive resin layer extends, to be connected to the second base electrode layer, from an end portion of the second base electrode layer to portions of the surfaces of the first and second primary surfaces and portions of the surfaces of the first and second lateral surfaces. The first base electrode layer is therefore not covered with the high-resistance first electroconductive resin layer, and the second base electrode layer is not covered with the high-resistance second electroconductive resin layer. Accordingly, the ESR is able to be lowered.

In a multilayer ceramic capacitor according to a preferred embodiment of the present invention, the first electroconductive resin layer does not cover the first base electrode layer, which is on the surface of the first end surface, and the second electroconductive resin layer does not cover the second base electrode layer, which is on the surface of the second end surface. The film thickness on the first end surface and second end surface sides of the multilayer body is therefore small. Accordingly, the design dimensions of the multilayer body are able to be large despite the presence of the electroconductive resin layers, and a manufacturer is able to design a high-capacitance multilayer ceramic capacitor.

In a multilayer ceramic capacitor according to a preferred embodiment of the present invention, the surfaces of the first and second primary surfaces and first and second lateral surfaces are not reached by the first base electrode layer or the second base electrode layer. The thickness of the first outer electrode and second outer electrode in the direction of stacking of the multilayer body is therefore small, providing more flexibility in the design of the multilayer body. Accordingly, a manufacturer is able to significantly increase the capacitance of multilayer ceramic capacitors.

A multilayer ceramic capacitor according to a preferred embodiment of the present invention, may include the first base electrode layer covering at least the exposed portion of the first inner electrodes, the second base electrode layer covering at least the exposed portion of the second inner electrodes, the first electroconductive resin layer extending, to be connected to the first base electrode layer, from an end portion of the exposed portion of the first inner electrodes, exposed on the first end surface, to portions of the surfaces of the first and second primary surfaces and portions of the surfaces of the first and second lateral surfaces, and the second electroconductive resin layer extending, to be connected to the second base electrode layer, from an end portion of the exposed portion of the second inner electrodes, exposed on the second end surface, to portions of the surfaces of the first and second primary surfaces and portions of the surfaces of the first and second lateral surfaces. Accordingly, even if the multilayer ceramic capacitor is exposed to a flexural stress due to thermal expansion and contraction of the substrate on which it is mounted due to thermal cycles, the flexural stress is absorbed by the first electroconductive resin layer, extending over a wide area from the first end surface of the multilayer ceramic capacitor to portions of the surfaces of the first and second primary surfaces and portions of the surfaces of the first and second lateral surfaces, and by the second electroconductive resin layer, extending over a wide area from the second end surface to portions of the surfaces of the first and second primary surfaces to portions of the surfaces of the first and second lateral surfaces. Accordingly, the anti-cracking performance of the multilayer ceramic capacitor is further improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
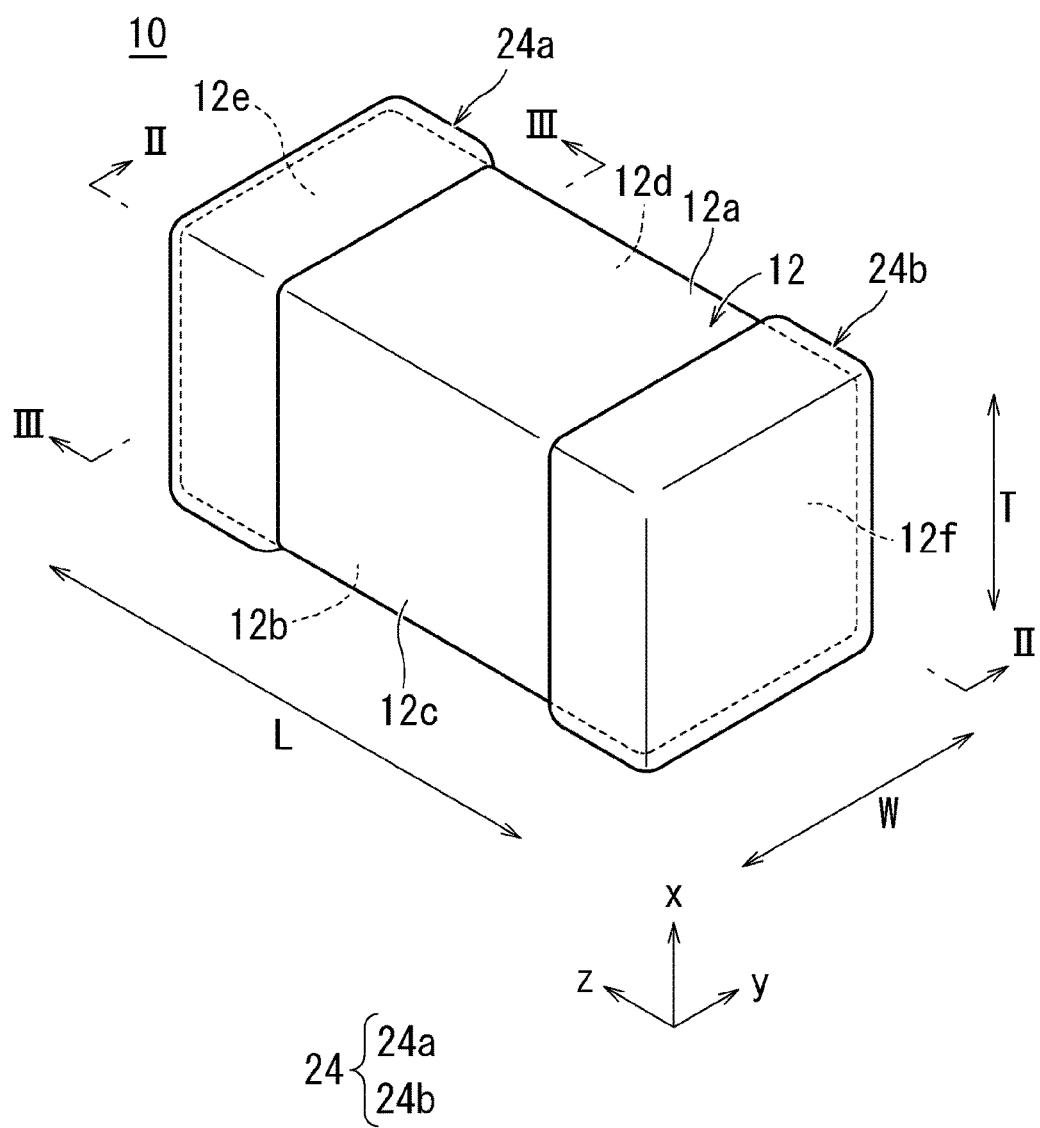
FIG. 1 is an external perspective view of an example of a multilayer ceramic capacitor according to a first preferred embodiment of the present invention.
Figure 2:
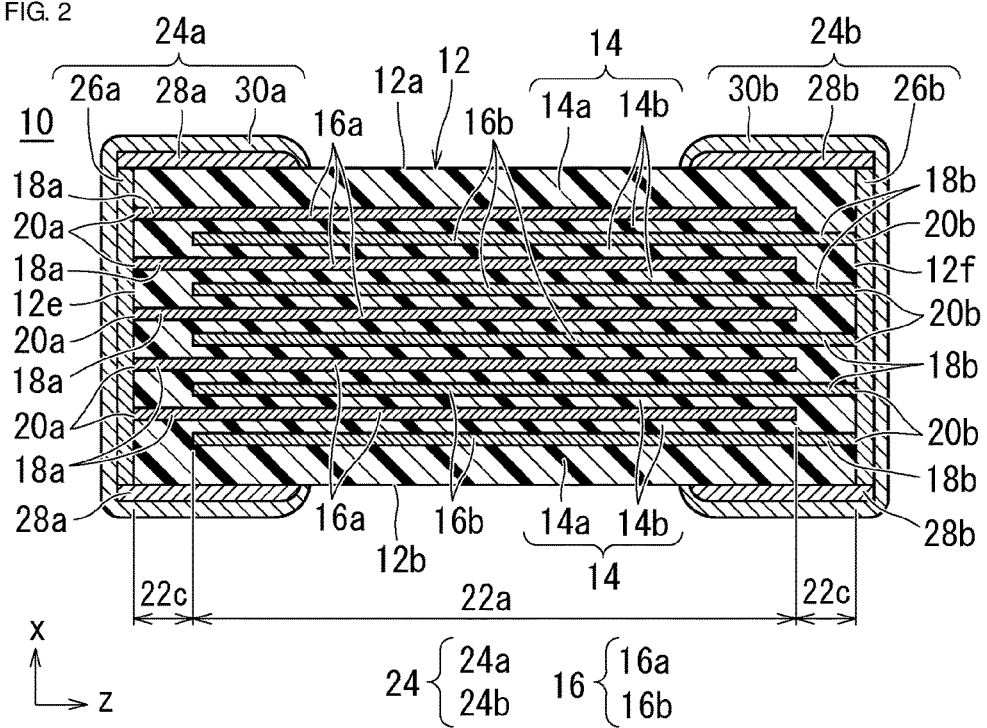
FIG. 2 is a cross-sectional view of the multilayer ceramic capacitor according to the first preferred embodiment of the present invention taken along line II-II of FIG. 1.
Figure 3:
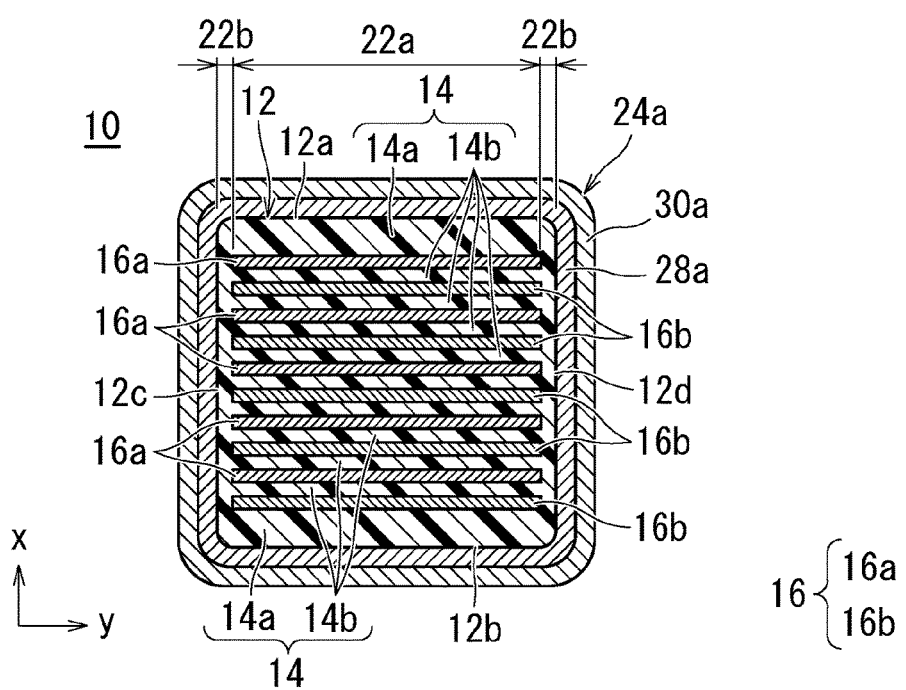
FIG. 3 is a cross-sectional view of the multilayer ceramic capacitor according to the first preferred embodiment of the present invention taken along line III-III of FIG. 1.

The following describes a multilayer ceramic capacitor according to a first preferred embodiment of the present invention. FIG. 1 is an external perspective view of an example of a multilayer ceramic capacitor according to the first preferred embodiment of the present invention. FIG. 2 is a cross-sectional view of the multilayer ceramic capacitor according to the first preferred embodiment taken along line II-II of FIG. 1. FIG. 3 is a cross-sectional view of the multilayer ceramic capacitor according to the first preferred embodiment taken along line III-III of FIG. 1.

As shown in FIGS. 1 to 3, the multilayer ceramic capacitor 10 includes a rectangular-parallelepiped or a substantially rectangular-parallelepiped multilayer body 12.

The multilayer body 12 includes a stack of multiple dielectric layers 14 and a stack of multiple inner electrodes 16. The multilayer body 12 further includes a first primary surface 12a and a second primary surface 12b facing each other in the direction of stacking x, a first lateral surface 12c and a second lateral surface 12d facing each other in the width direction y, the direction perpendicular or substantially perpendicular to the direction of stacking x, and a first end surface 12e and a second end surface 12f facing each other in the length direction z, the direction perpendicular or substantially perpendicular to the direction of stacking x and the width direction y. This multilayer body 12 preferably includes rounded corner and edge portions, for example. A corner portion is a portion in which three adjacent surfaces of the multilayer body intersect, and an edge portion is a portion in which two adjacent surfaces of the multilayer body intersect. The first primary surface 12a and the second primary surface 12b, the first lateral surface 12c and the second lateral surface 12d, and the first end surface 12e and the second end surface 12f may include structural features, for example, irregularities, provided in a portion of or over the entire area thereof.

The dielectric layers 14 include outer layer portions 14a and an inner layer portion 14b. The outer layer portions 14a are located on the first primary surface 12a side and second primary surface side 12b of the multilayer body 12, and include the dielectric layer 14 that is positioned between the first primary surface 12a and the inner electrode 16 closest to the first primary surface 12a the dielectric layer 14 that is positioned between the second primary surface 12b and the inner electrode 16 closest to the second primary surface 12b. The region sandwiched between the two outer layer portions 14a is the inner layer portion 14b. The thickness of an outer layer portion 14a is preferably about 10 μm or more and about 300 μm or less, for example.

The dielectric layers 14 may be formed of, for example, a dielectric material. The dielectric material may be, for example, a dielectric ceramic including a component such as $BaTiO_3$, $CaTiO_3$, $SrTiO_3$, or $CaZrO_3$. If a dielectric material is included as a primary component of the dielectric layers 14, the dielectric layers 14 may include a secondary component, which is a component less abundant than the primary component, selected according to the desired characteristics of the electric component main body 12, for example, a Mn compound, an Fe compound, a Cr compound, a Co compound, or a Ni compound.

The thickness of a fired dielectric layer 14 is preferably about 0.4 μm or more and about 20 μm or less, for example. The number of dielectric layers is preferably about 20 or more and about 2000 or less, for example, including the outer layer portions 14a and inner layer portion 14b.

The multilayer body 12 includes, as the multiple inner electrodes 16, multiple first inner electrodes 16a and multiple second inner electrodes 16b. The multiple inner electrodes are rectangular or substantially rectangular in shape, for example. The multiple first inner electrodes 16a and the multiple second inner electrodes 16b are buried so that they are arranged alternately and equally or substantially equally spaced along the direction of stacking x of the multilayer body 12.

On one end side of a first inner electrode 16a is a first extended electrode portion 18a, extended to the first end surface 12e of the multilayer body 12. The first extended electrode portion 18a includes an end portion extending to the surface of the first end surface 12e of the multilayer body 12 and includes a first exposed portion 20a.

On one end side of a second inner electrode 16b is a second extended electrode portion 18b, extended to the second end surface 12f of the multilayer body 12. The second extended electrode portion 18b includes an end portion extended to the surface of the second end surface 12f of the multilayer body 12 and includes a second exposed portion 20b.

The multilayer body 12 includes, in the inner layer portion 14b of the dielectric layers 14, facing-electrode portions 22a, in which the first inner electrodes 16a and the second inner electrodes 16b face each other. Furthermore, the multilayer body 12 includes the lateral portions 22b of the multilayer body 12 located between one end of the facing-electrode portions 22a in the width direction W and the first lateral surface 12c and between the other end of the facing-electrode portions 22a in the width direction W and the second lateral surface 12d (hereinafter referred to as "W gaps"). Moreover, the multilayer body 12 includes the lateral portions 22c of the multilayer body 12 located between the end portions of the first inner electrodes 16a opposite the first extended electrode portions 18a and the second end surface 12f and between the end portions of the second inner electrodes 16b opposite the second extended electrode portions 18b and the first end surface 12e (hereinafter referred to as "L gaps").

The inner electrodes 16 include, for example, a metal such as Ni, Cu, Ag, Pd, or Au or an appropriate electroconductive material including one of such metals, such as an alloy including at least one of such metals, e.g., an Ag—Pd alloy. The inner electrodes 16 may further include dielectric particles of a same or similar composition series as the ceramic material included in the dielectric layers 14.

The thickness of an inner electrode 16 is preferably about 0.2 μm or more and about 2.0 μm or less, for example. The number of inner electrodes 16 is preferably about 2 or more and about 1600 or less, for example. The percentage of the area of the dielectric layers 14 covered with the inner electrodes 16 is preferably about 50% or more and about 100% or less, for example.

On the first end surface 12e side and second end surface 12f side of the multilayer body 12 are located outer electrodes 24. The outer electrodes 24 include a first outer electrode 24a and a second outer electrode 24b.

The first outer electrode 24a is located on the first end surface 12e side of the multilayer body 12. The first outer electrode 24a covers at least a portion of the first end surface 12e of the multilayer body 12. In this case, the first outer electrode 24a is electrically coupled to the first inner electrodes 16a via the first exposed portions 20a.

The second outer electrode 24b is located on the second end surface 12f side of the multilayer body 12. The second outer electrode 24b covers at least a portion of the second end surface 12f of the multilayer body 12. In this case, the second outer electrode 24b is electrically coupled to the second inner electrodes 16b via the second exposed portions 20b.

Inside the multilayer body 12, a first inner electrode 16a and a second inner electrode 16b face each other with a dielectric layer 14 therebetween in each facing-electrodes portion 22a, to generate electrostatic capacitances. Accordingly, an electrostatic capacitance is provided between the first outer electrode 24a, to which the first inner electrodes 16a are electrically coupled, and the second outer electrode 24b, to which the second inner electrodes 16b are electrically coupled. Accordingly, capacitive characteristics of the multilayer ceramic capacitor 10 are defined by the electrostatic capacitances.

The first outer electrode 24a includes a first base electrode layer 26a including an electroconductive metal and glass, a first electroconductive resin layer 28a including a thermosetting resin and metal, and a first plating layer 30a. The second outer electrode 24b includes a second base electrode layer 26b including an electroconductive metal and glass, a second electroconductive resin layer 28b including a thermosetting resin and metal, and a second plating layer 30b.

The first base electrode layer 26a is only located on the surface of the first end surface 12e of the multilayer body 12. The second base electrode layer 26b is only located on the surface of the second end surface 12f of the multilayer body 12. If the corner and edge portions of the multilayer body 12 are rounded, for example, the first base electrode layer 26a and the second base electrode 26b may reach the corner and edge portions, but preferably not to extend over the first primary surface 12a or second primary surface 12b or the upper surfaces of the first lateral surface 12c and second lateral surface 12d.

The first base electrode layer 26a and the second base electrode 26b (hereinafter also simply referred to as the base electrode layers) include at least one electroconductive metal and at least one glass material. The at least one electroconductive metal for the base electrode layers is selected from, for example, Cu, Ni, Ag, Pd, an Ag—Pd alloy, and Au. The at least one glass material for the base electrode layers is selected from elements including, for example, B, Si, Ba, Mg, Al, and Li. Multiple base electrode layers may be provided on a side, for example. The base electrode layers, produced through the application of an electroconductive paste including glass and metal to the multilayer body 12 and subsequent baking of the paste, may be fired simultaneously with the dielectric layers 14 and the inner electrodes 16 or baked after the firing of the dielectric layers 14 and the inner electrodes 16, for example. The thickness of the thickest portion of a base electrode layer is preferably about 10 µm or more and about 150 µm or less, for example.

The first electroconductive resin layer 28a extends, to be connected to the first base electrode layer 26a, from an end portion of the first base electrode layer 26a to portions of the surfaces of the first primary surface 12a and second primary surface 12b and portions of the surfaces of the first lateral surface 12c and second lateral surface 12d.

The second electroconductive resin layer 28b extends, to be connected to the second base electrode layer 26b, from an end portion of the second base electrode layer 26b to portions of the surfaces of the first primary surface 12a and second primary surface 12b and portions of the surfaces of the first lateral surface 12c and second lateral surface 12d. The first electroconductive resin layer 28a, therefore, does not reach the first end surface 12e, and the second electroconductive resin layer 28b does not reach the second end surface 12f.

If the corner and edge portions of the multilayer body are rounded, for example, the first electroconductive resin layer 28a and the second electroconductive resin layer 28b may overlap with the surfaces of any portions of the first base electrode layer 26a and second base electrode layer 26b reaching the corners and edge portions, but preferably not to extend over the uppermost surfaces, over the first end surface 12e and second end surface 12f, of the first base electrode layer 26a and second base electrode layer 26b.

The first electroconductive resin layer 28a and the second electroconductive resin layer 28b (hereinafter also simply referred to as the electroconductive resin layers) include a thermosetting resin and metal. By including a thermosetting resin, the electroconductive resin layers are more flexible than, for example, plating films and the base electrode layers, which are produced by firing an electroconductive paste. Even if the multilayer ceramic capacitor 10 is exposed to physical impact or impact due to thermal cycles, for example, the electroconductive resin layers define and function as buffer layers, significantly reducing or preventing cracking of the multilayer ceramic capacitor 10.

Specific examples of thermosetting resins include various thermosetting resins, for example, epoxy resins, phenolic resins, urethane resins, silicone resins, and polyimide resins. In particular, epoxy resins with heat resistance, moisture resistance, adhesiveness, and the like, are preferred types of resin, for example.

The electroconductive resin layers preferably include a curing agent together with the thermosetting resin, for example. If the base resin is an epoxy resin, various compounds may be included as curing agent for the epoxy resin, including phenolic, amine, acid-anhydride, and imidazole compounds.

The metal included in the electroconductive resin layers may be Ag, Cu, or an alloy of Ag and Cu. A metal with a Ag-coated surface may be included, and is preferably Cu or Ni, for example. Cu that has been treated to significantly reduce or prevent oxidation may also be included, for example. By including a Ag-coated metal, a manufacturer is able to include an inexpensive base metal while maintaining the characteristics of Ag.

The amount of the metal included in an electroconductive resin layer is preferably about 35 vol % or more and about 75 vol % or less of the total volume of the electroconductive resin layer, for example.

The shape of the metal included in the electroconductive resin layers is not limited. The metal (electroconductive filler) included in the electroconductive resin layers may be spherical or substantially spherical, flat, or in any other shape, for example. It is, however, preferred that the metal included in the electroconductive resin layers be a mixture of a spherical or substantially spherical metal and a flat metal.

The average particle diameter of the metal included in the electroconductive resin layers is not limited. The average particle diameter of the metal (electroconductive filler) included in the electroconductive resin layers may be, for example, about 0.3 µm or more and about 10 µm or less.

By including the metal in the electroconductive resin layers, the electroconductive resin layers are able to conduct electric current. Specifically, particles of the metal (electroconductive filler) included in the electroconductive resin layers come into contact with each other to provide electric current paths in the electroconductive resin layers.

The metal included in the electroconductive resin layers may include multiple metals and may include, for example, a first metal component and a second metal component. The first metal component is preferably, for example, Sn, In, Bi, or an alloy including at least one of these metals. It is particularly preferred that the first metal component be Sn or an alloy including Sn, for example. Specific examples of alloys including Sn include Sn—Ag, Sn—Bi, and Sn—Ag—Cu. The second metal component is preferably, for example, metal such as Cu, Ag, Pd, Pt, or Au or an alloy including at least one of these metals. It is particularly preferred that the second metal component be Cu or Ag, for example.

The first plating layer 30a covers at least a portion of the first base electrode layer 26a and the first electroconductive resin layer 28a. Specifically, the first plating layer 30a is located on the first end surface 12e on the surfaces of the first base electrode layer 26a and first electroconductive resin layer 28a, preferably reaching the first primary surface 12a, second primary surface 12b, first lateral surface 12c, and second lateral surface 12d on the surface of the first electroconductive resin layer 28a, for example. Alternatively, the first plating layer 30a may be confined to the surface of the first base electrode layer 26a, which is located on the first end surface 12e.

The second plating layer 30b covers at least a portion of the second base electrode layer 26b and the second electroconductive resin layer 28b. Specifically, the second plating layer 30b is located on the second end surface 12f on the surfaces of the second base electrode layer 26b and second electroconductive resin layer 28b, preferably reaching the first primary surface 12a, second primary surface 12b, first lateral surface 12c, and second lateral surface 12d on the surface of the second electroconductive resin layer 28b, for example. Alternatively, the second plating layer 30b may be confined to the surface of the second base electrode layer 26b, which is located on the second end surface 12f.

The first plating layer 30a and the second plating layer 30b (hereinafter also simply referred to as the plating layers)

include, for example, at least one selected from metals such as Cu, Ni, Sn, Ag, Pd, an Ag—Pd alloy, and Au or an alloy including these metals.

The plating layers may include a multilayer structure, for example. If the plating layers include a multilayer structure, the plating layers preferably include, for example, a two-layer structure and of a Ni plating layer and a Sn plating layer. Covering at least a portion of each of the surfaces of the base electrode layers and electroconductive resin layers with a Ni plating layer significantly reduces or prevents, during the mounting of the multilayer ceramic capacitor 10, corrosion of the base electrode layers and the electroconductive resin layers by the mounting solder. Providing a Sn plating layer on the surface of the Ni plating layer significantly improves spreading of the solder during the mounting of the multilayer ceramic capacitor 10, making the mounting easier.

The thickness of each layer in the plating layers is preferably about 1 μm or more and about 15 μm or less, for example.

The dimension of the multilayer ceramic capacitor 10 in the length direction z including the multilayer body 12, first outer electrode 24a, and second outer electrode 24b is defined as dimension L, that of the multilayer ceramic capacitor 10 in the direction of stacking x including the multilayer body 12, first outer electrode 24a, and second outer electrode 24b as dimension T, and that of the multilayer ceramic capacitor 10 in the width direction y including the multilayer body 12, first outer electrode 24a, and second outer electrode 24b as dimension W.

The dimensions of the multilayer ceramic capacitor 10 preferably are about 0.25 mm or more and about 3.20 mm or less in dimension L, in the length direction z, about 0.125 mm or more and about 2.50 mm or less in dimension W, in the width direction y, and about 0.125 mm or more and about 2.50 mm or less in dimension T, in the direction of stacking x, for example. Dimension L, in the length direction z, does not need to be longer than dimension W, in the width direction y. The dimensions of the multilayer ceramic capacitor 10 are able to be measured by a microscope, for example.

In the multilayer ceramic capacitor 10 shown in FIG. 1, the first electroconductive resin layer 28a extends, to be connected to the first base electrode layer 26a, from an end portion of the first base electrode layer 26a to portions of the surfaces of the first primary surface 12a and second primary surface 12b and portions of the surfaces of the first lateral surface 12c and second lateral surface 12d, and the second electroconductive resin layer 28b extends, to be connected to the second base electrode layer 26b, from an end portion of the second base electrode layer 26b to portions of the surfaces of the first primary surface 12a and second primary surface 12b and portions of the surfaces of the first lateral surface 12c and second lateral surface 12d. The first base electrode layer 26a is therefore not covered with the high-resistance first electroconductive resin layer 28a, and the second base electrode layer 26b is not covered with the high-resistance second electroconductive resin layer 28b. Accordingly, the ESR is able to be lowered.

In the multilayer ceramic capacitor 10 shown in FIG. 1, furthermore, the first electroconductive resin layer 28a does not cover the first base electrode layer 26a, which is located on the surface of the first end surface 12e, and the second electroconductive resin layer 28b does not cover the second base electrode layer 26b, which is located on the surface of the second end surface 12f. The film thickness on the first end surface 12e and second end surface 12f sides of the multilayer body 12 is therefore small. Accordingly, the design dimensions of the multilayer body 12 are able to be large, and a manufacturer is able to design a high-capacitance multilayer ceramic capacitor.

In the multilayer ceramic capacitor 10 shown in FIG. 1, moreover, the surfaces of the first primary surface 12a, second primary surface 12b, first lateral surface 12c, and second lateral surface 12d are not reached by the first base electrode layer 26a or the second base electrode layer 26b. The thickness of the first outer electrode 24a and second outer electrode 24b in the direction of stacking x of the multilayer body 12 is therefore small, providing more flexibility in the design of the multilayer body 12. As a result, a manufacturer is able to significantly increase the capacitance of multilayer ceramic capacitors.

Second Preferred Embodiment

Figure 4:
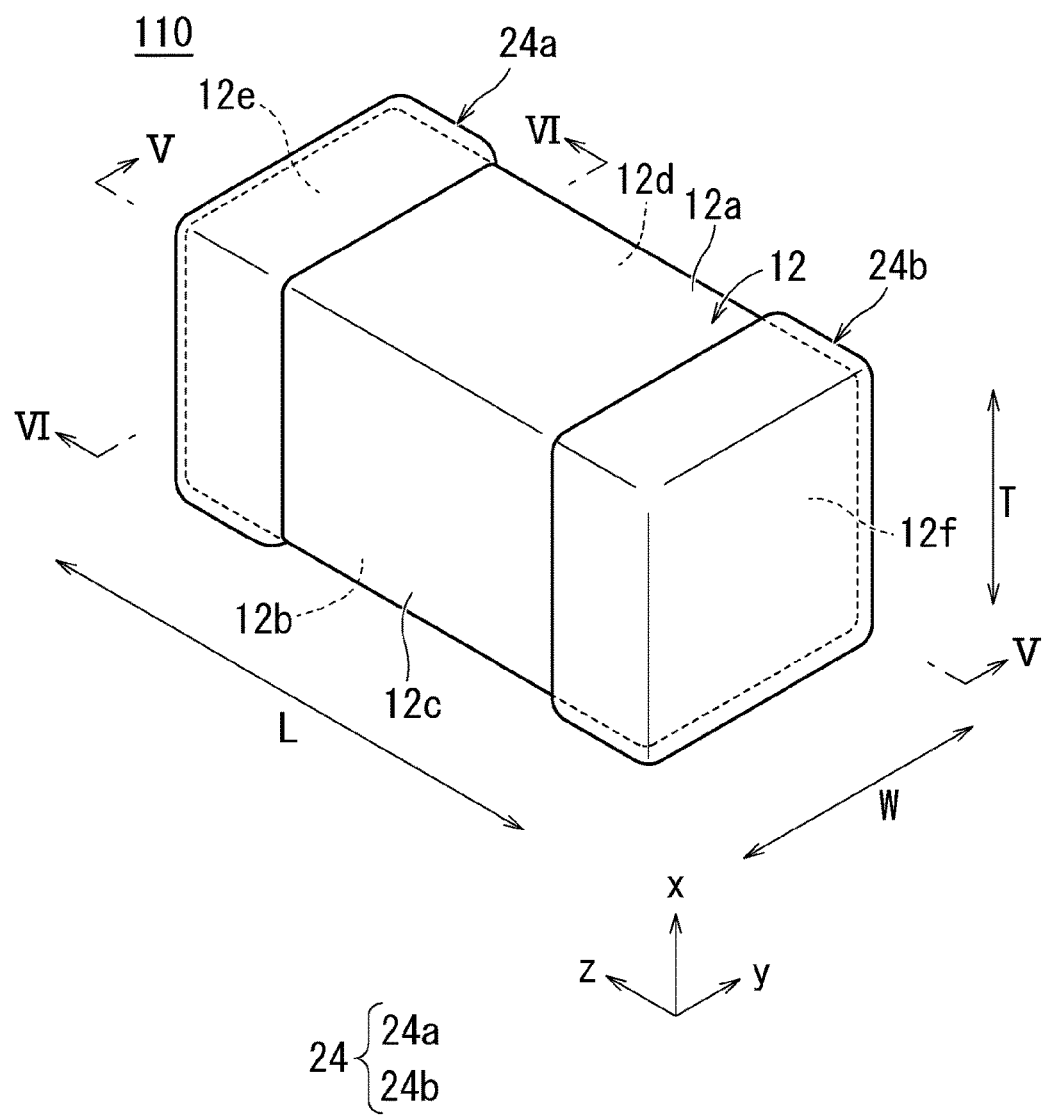
FIG. 4 is an external perspective view of a multilayer ceramic capacitor according to a second preferred embodiment of the present invention.
Figure 5:
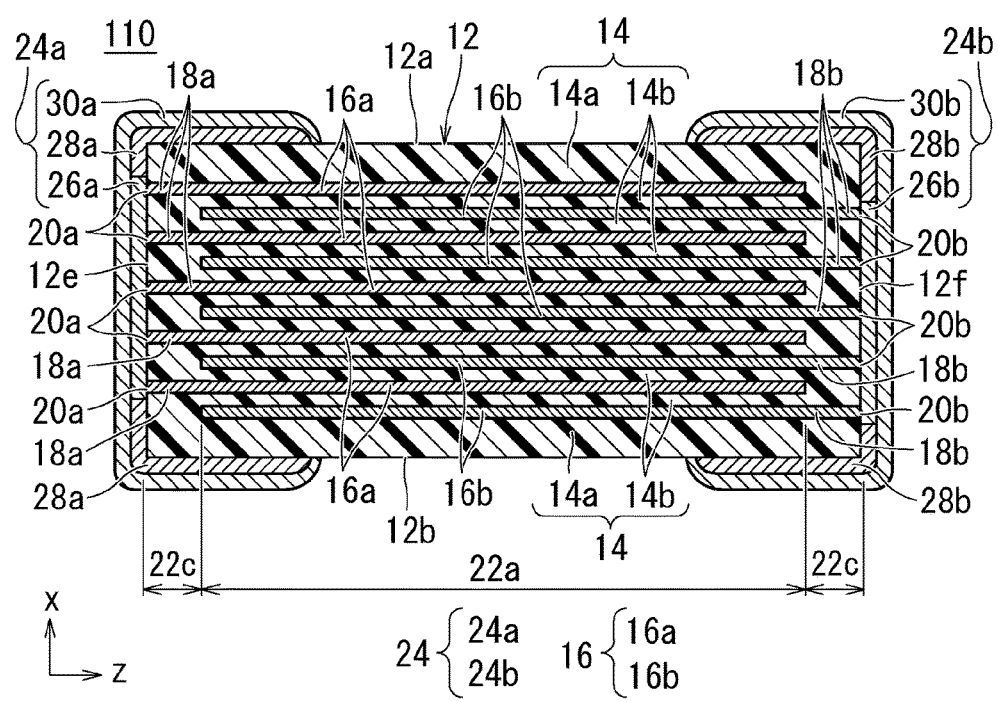
FIG. 5 is a cross-sectional view of the multilayer ceramic capacitor according to the second preferred embodiment of the present invention taken along line V-V of FIG. 4.
Figure 6:
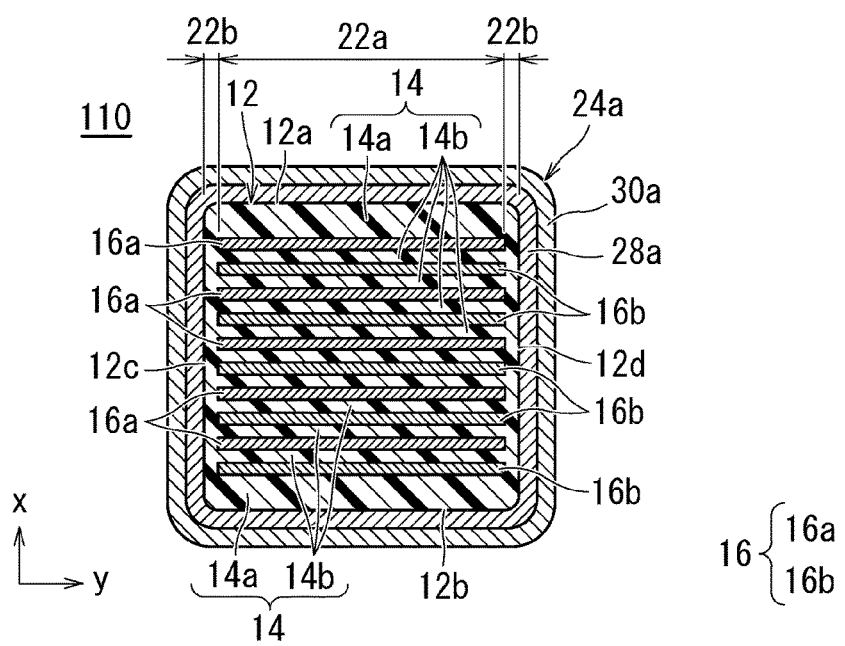
FIG. 6 is a cross-sectional view of the multilayer ceramic capacitor according to the second preferred embodiment of the present invention taken alone line VI-VI of FIG. 4.

The following describes a multilayer ceramic capacitor according to a second preferred embodiment of the present invention. FIG. 4 is an external perspective view of an example of a multilayer ceramic capacitor according to the second preferred embodiment of the present invention. FIG. 5 is a cross-sectional view of the multilayer ceramic capacitor according to the second preferred embodiment taken along line V-V of FIG. 4. FIG. 6 is a cross-sectional view of the multilayer ceramic capacitor according to the second preferred embodiment taken along line VI-VI of FIG. 4. The multilayer ceramic capacitor 110 according to the second preferred embodiment includes a same or a similar structure as the multilayer ceramic capacitor 10 described using FIG. 1, except that the arrangement of the base electrode layers and electroconductive resin layers in the outer electrodes is different. Elements of the second preferred embodiment that are the same as in the multilayer ceramic capacitor 10 shown in FIG. 1 with respect to the first preferred embodiment are referenced by the same numerals as in FIG. 1 and repeated description thereof is omitted.

In the multilayer ceramic capacitor 110 shown in FIG. 4, the first base electrode layer 26a covers at least the first exposed portions 20a, of the first inner electrodes 16a, on the surface of the first end surface 12e. The second base electrode layer 26b covers at least the exposed portions 20b of the second inner electrodes 16b on the surface of the second end surface 12f.

In the multilayer ceramic capacitor 110 shown in FIG. 4, the first electroconductive resin layer 28a extends, to be connected to the first base electrode layer 26a, from an end portion of the exposed portions 20a of the first inner electrodes 16a, exposed on the first end surface 12e, to portions of the surfaces of the first primary surface 12a and second primary surface 12b and portions of the surfaces of the first lateral surface 12c and second lateral surface 12d.

The second electroconductive resin layer 28b extends, to be connected to the second base electrode layer 26b, from an end portion of the exposed portions 20b of the second inner electrodes 16b, exposed on the second end surface 12f, to portions of the surfaces of the first primary surface 12a and second primary surface 12b and portions of the surfaces of the first lateral surface 12c and second lateral surface 12d.

The multilayer ceramic capacitor 110 shown in FIG. 4 provides the following advantages in addition to the same or similar advantages of the multilayer ceramic capacitor 10 according to the first preferred embodiment.

Even if the multilayer ceramic capacitor 110 is exposed to a flexural stress from thermal expansion and contraction of the substrate on which it is mounted, for example, due to thermal cycles, the flexural stress is absorbed by the first electroconductive resin layer 28a, extending over a wide area from the first end surface 12e of the multilayer ceramic capacitor 110 to portions of the surfaces of the first primary surface 12a and second primary surface 12b and portions of the surfaces of the first lateral surface 12c and second lateral surface 12d, and by the second electroconductive resin layer 28b, extending over a wide area from the second end surface 12f to portions of the surfaces of the first primary surface 12a and second primary surface 12b to portions of the surfaces of the first lateral surface 12c and second lateral surface 12d. Accordingly, cracking of the multilayer ceramic capacitor 110 is able to be further significantly reduced or prevented.

The following describes a preferred embodiment of a method for the production of multilayer ceramic capacitors including the above-described structure. The multilayer ceramic capacitor 10 is taken as an example.

First, ceramic green sheets, an inner-electrode electroconductive paste that forms the inner electrodes 16, and an outer-electrode electroconductive paste that forms the outer electrodes 24 are prepared. The ceramic green sheets, the inner-electrode electroconductive paste, and the outer-electrode electroconductive paste include an organic binder and a solvent.

Then, a predetermined pattern, for example, of the inner-electrode electroconductive paste, is printed on the ceramic green sheets to form a pattern of the inner electrodes 16. The application of the inner-electrode electroconductive paste is able to be performed by various methods, for example, screen printing and gravure printing.

Then, a first predetermined number of outer-layer ceramic green sheets, with no pattern of inner electrodes 16 printed thereon, are stacked, the ceramic green sheets with a printed inner-electrode pattern are stacked on the first predetermined number of outer-layer ceramic green sheets, and a second predetermined number of outer-layer ceramic green sheets are stacked on the ceramic green sheets with the printed inner-electrode pattern, producing a multilayer-body block. Optionally, the multilayer-body block may be subjected to pressure bonding in the direction of stacking by, for example, isostatic pressing.

Then, the multilayer-body block is cut to a predetermined shape and predetermined dimensions to provide raw multilayer-body chips. At this point the corner and edge portions of the multilayer bodies may be rounded, for example, by barreling. The raw multilayer-body chips are then fired to provide multilayer bodies. The firing temperature for the raw multilayer-body chips depends on the material for the ceramic green sheets and the material for the inner-electrode electroconductive paste but preferably is about 900° C. or more and about 1300° C. or less, for example.

Then, the outer-electrode electroconductive paste is applied to the two end surfaces of the fired multilayer bodies and baked to form the first base electrode layer 26a, of the first outer electrode 24a, and the second base electrode layer 26b, of the second outer electrode 24b. The baking temperature is preferably about 700° C. or more and about 900° C. or less, for example.

The application of the outer-electrode electroconductive paste only to the first end surface 12e of the multilayer bodies 12 to form the first base electrode layer 26a is performed either by masking the surfaces of the first primary surface 12a, second primary surface 12b, first lateral surface 12c, and second lateral surface 12d and dipping only the first end surface 12e in the outer-electrode electroconductive paste, or by applying the outer-electrode electroconductive paste only to the first end surface 12e by screen printing. Accordingly, the first base electrode layer 26a is able to be located only on the first end surface 12e.

The application of the outer-electrode electroconductive paste only to the second end surface 12f of the multilayer bodies 12 to form the second base electrode layer 26b is performed either by masking the surfaces of the first primary surface 12a, second primary surface 12b, first lateral surface 12c, and second lateral surface 12d and dipping only the second end surface 12f in the outer-electrode electroconductive paste, or by applying the outer-electrode electroconductive paste only to the second end surface 12f by screen printing. Accordingly, the second base electrode layer 26b is able to be located only on the second end surface 12f.

Then, an electroconductive resin paste that includes a thermosetting resin and metal is applied to the primary surfaces and the lateral surfaces and heated at a temperature of about 250° C. or more and about 550° C. or less so that the resin is thermally cured, to form the first electroconductive resin layer 28a of the first outer electrode 24a and the second electroconductive resin layer 28b of the second outer electrode 24b.

The application of the electroconductive resin paste to the first end surface 12e side of the first primary surface 12a, second primary surface 12b, first lateral surface 12c, and second lateral surface 12d of the multilayer body 12 to form the first electroconductive resin layer 28a is performed either by masking the surface of the first end surface 12e and dipping the first end surface 12e side of the surfaces of the first primary surface 12a, second primary surface 12b, first lateral surface 12c, and second lateral surface 12d in the electroconductive resin paste, or by applying the electroconductive resin paste to the first end surface 12e side of the surfaces of the first primary surface 12a, second primary surface 12b, first lateral surface 12c, and second lateral surface 12d by screen printing. Accordingly, the first electroconductive resin layer 28a is able to be formed.

The application of the electroconductive resin paste to the second end surface 12f side of the first primary surface 12a, second primary surface 12b, first lateral surface 12c, and second lateral surface 12d of the multilayer body 12 to form the second electroconductive resin layer 28b, is performed either by masking the surface of the second end surface 12f and dipping the second end surface 12f side of the surfaces of the first primary surface 12a, second primary surface 12b, first lateral surface 12c, and second lateral surface 12d in the electroconductive resin paste, or by applying the electroconductive resin paste to the second end surface 12f side of the surfaces of the first primary surface 12a, second primary surface 12b, first lateral surface 12c, and second lateral surface 12d by screen printing. Accordingly, the second electroconductive resin layer 28b is able to be formed.

The atmosphere in which the applied paste is heated is preferably a $N_2$ atmosphere, for example.

Preferably, the oxygen concentration is about 100 ppm or less to significantly reduce or prevent splashing of the electroconductive resin paste and the oxidation of the metal components, for example.

Then, the first plating layer 30a is formed to cover at least a portion of the first base electrode layer 26a and at least a portion of the first electroconductive resin layer 28a, and the second plating layer 30b is formed to cover at least a portion of the second base electrode layer 26b and at least a portion of the second electroconductive resin layer 28b.

If the first plating layer 30a and the second plating layer 30b are Ni plating layers, the first plating layer 30a and the second plating layer 30b are preferably formed by electroplating, for example.

If the first plating layer 30a and the second plating layer 30b are two layers, Sn plating layers are optionally formed on the surfaces of their respective Ni plating layers.

As described above, the multilayer ceramic capacitor 10 shown in FIG. 1 is able to be produced.

Experiments were performed on multilayer ceramic capacitors 10 obtained by the above-described method to measure their ESR and determine their upsizing factors, which is the factor by which a volume of a multilayer body is increased from a volume of a multilayer body of a comparative capacitor.

As Examples, sample multilayer ceramic capacitors of Examples 1 to 8, including the specifications described below, were fabricated in accordance with the above-described method for the production of multilayer ceramic capacitors.

Example 1 includes multilayer ceramic capacitors with the specifications given below.
- Chip size (design values): Length×width×height=0.245 mm×0.122 mm×0.120 mm
- Material for the dielectric layers: $BaTiO_3$
- Capacitance: 0.01 μF
- Rated voltage: 6.3 V
- Material for the inner electrodes: Ni
- Base electrode layers
  - Material for the base electrode layers: Electrodes including Cu and glass
  - Thickness of the base electrode layers (a middle portion on the end surfaces): 10 μm
- Electroconductive resin layers
  - Metal: Ag
  - Resin: Epoxy-based
  - Thickness of the electroconductive resin layers (a middle portion on the primary surface side): 16 μm
- Plating layers
  - Plating layers: Two-layer structure, a Ni plating layer and a Sn plating layer
  - Thickness of the Ni plating layer: 3.5 μm
  - Thickness of the Sn plating layer: 3.5 μm Example 2 includes multilayer ceramic capacitors with the specifications given below.
- Chip size (design values): Length×width×height=0.245 mm×0.122 mm×0.120 mm
- Material for the dielectric layers: $CaZrO_3$
- Capacitance: 0.0001 μF
- Rated voltage: 50 V
- Material for the inner electrodes: Ni
- Base electrode layers
  - Material for the base electrode layers: Electrodes including Cu and glass
  - Thickness of the base electrode layers (a middle portion on the end surfaces): 10 μm
- Electroconductive resin layers
  - Metal: Ag
  - Resin: Epoxy-based
  - Thickness of the electroconductive resin layers (a middle portion on the primary surface side): 16 μm
- Plating layers
  - Plating layers: Two-layer structure, a Ni plating layer and a Sn plating layer
  - Thickness of the Ni plating layer: 3.5 μm
  - Thickness of the Sn plating layer: 3.5 μm Example 3 includes multilayer ceramic capacitors with the specifications given below.
- Chip size (design values): Length×width×height=0.410 mm×0.210 mm×0.210 mm
- Material for the dielectric layers: $BaTiO_3$
- Capacitance: 0.1 μF
- Rated voltage: 6.3 V
- Material for the inner electrodes: Ni
- Base electrode layers
  - Material for the base electrode layers: Electrodes including Cu and glass
  - Thickness of the base electrode layers (a middle portion on the end surfaces): 25 μm
- Electroconductive resin layers
  - Metal: Ag
  - Resin: Epoxy-based
  - Thickness of the electroconductive resin layers (a middle portion on the primary surfaces): 17 μm
- Plating layers
  - Plating layers: Two-layer structure, a Ni plating layer and a Sn plating layer
  - Thickness of the Ni plating layer: 5.0 μm
  - Thickness of the Sn plating layer: 4.5 μm Example 4 includes multilayer ceramic capacitors with the specifications given below.
- Chip size (design values): Length×width×height=0.410 mm×0.210 mm×0.210 mm
- Material for the dielectric layers: $CaZrO_3$
- Capacitance: 0.0001 μF
- Rated voltage: 50 V
- Material for the inner electrodes: Ni
- Base electrode layers
  - Material for the base electrode layers: Electrodes including Cu and glass
  - Thickness of the base electrode layers (a middle portion on the end surfaces): 25 μm
- Electroconductive resin layers
  - Metal: Ag
  - Resin: Epoxy-based
  - Thickness of the electroconductive resin layers (a middle portion on the primary surfaces): 17 μm
- Plating layers
  - Plating layers: Two-layer structure, a Ni plating layer and a Sn plating layer
  - Thickness of the Ni plating layer: 5.0 μm
  - Thickness of the Sn plating layer: 4.5 μm Example 5 includes multilayer ceramic capacitors with the specifications given below.
- Chip size (design values): Length×width×height=0.635 mm×0.338 mm×0.338 mm
- Material for the dielectric layers: $BaTiO_3$
- Capacitance: 1 μF
- Rated voltage: 6.3 V
- Material for the inner electrodes: Ni
- Base electrode layers
  - Material for the base electrode layers: Electrodes including Cu and glass
  - Thickness of the base electrode layers (a middle portion on the end surfaces): 30 μm
- Electroconductive resin layers
  - Metal: Ag
  - Resin: Epoxy-based
  - Thickness of the electroconductive resin layers (a middle portion on the primary surfaces): 13 μm
- Plating layers
  - Plating layers: Two-layer structure, a Ni plating layer and a Sn plating layer
  - Thickness of the Ni plating layer: 5.0 μm
  - Thickness of the Sn plating layer: 4.5 μm Example 6 includes multilayer ceramic capacitors with the specifications given below.

Chip size (design values): Length×width×height=0.635 mm×0.338 mm×0.338 mm
Material for the dielectric layers: CaZrO$_3$
Capacitance: 0.0001 μF
Rated voltage: 50 V
Material for the inner electrodes: Ni
Base electrode layers
    Material for the base electrode layers: Electrodes including Cu and glass
    Thickness of the base electrode layers (a middle portion on the end surfaces): 30 μm
Electroconductive resin layers
    Metal: Ag
    Resin: Epoxy-based
    Thickness of the electroconductive resin layers (a middle portion on the primary surfaces): 13 μm
Plating layers
    Plating layers: Two-layer structure, a Ni plating layer and a Sn plating layer
    Thickness of the Ni plating layer: 5.0 μm
    Thickness of the Sn plating layer: 4.5 μm Example 7 includes multilayer ceramic capacitors with the specifications given below.
Chip size (design values): Length×width×height=3.450 mm×2.750 mm×2.750 mm
Material for the dielectric layers: BaTiO$_3$
Capacitance: 330 μF
Rated voltage: 4 V
Material for the inner electrodes: Ni
Base electrode layers
    Material for the base electrode layers: Electrodes including Cu and glass
    Thickness of the base electrode layers (a middle portion on the end surfaces): 85 μm
Electroconductive resin layers
    Metal: Ag
    Resin: Epoxy-based
    Thickness of the electroconductive resin layers (a middle portion on the primary surfaces): 62 μm
Plating layers
    Plating layers: Two-layer structure, a Ni plating layer and a Sn plating layer
    Thickness of the Ni plating layer: 4.0 μm
    Thickness of the Sn plating layer: 4.0 μm Example 8 includes multilayer ceramic capacitors with the specifications given below.
Chip size (design values): Length×width×height=3.450 mm×2.750 mm×2.750 mm
Material for the dielectric layers: CaTiO$_3$
Capacitance: 0.47 μF
Rated voltage: 6.3 V
Material for the inner electrodes: Ni
Base electrode layers
    Material for the base electrode layers: Electrodes including Cu and glass
    Thickness of the base electrode layers (a middle portion on the end surfaces): 85 μm
Electroconductive resin layers
    Metal: Ag
    Resin: Epoxy-based
    Thickness of the electroconductive resin layers (a middle portion on the primary surfaces): 62 μm
Plating layers
    Plating layers: Two-layer structure, a Ni plating layer and a Sn plating layer
    Thickness of the Ni plating layer: 4.0 μm
    Thickness of the Sn plating layer: 4.0 μm As Comparative Examples, sample multilayer ceramic capacitors of Comparative Examples 1 to 8, including the specifications given below, were fabricated. Unlike those of the Examples described above, the multilayer ceramic capacitors of the Comparative Examples do not include electroconductive resin layers in the outer electrodes.

Comparative Example 1 includes multilayer ceramic capacitors with the specifications given below.
Chip size (design values): Length×width×height=0.245 mm×0.122 mm×0.120 mm
Material for the dielectric layers: BaTiO$_3$
Capacitance: 0.01 μF
Rated voltage: 6.3 V
Material for the inner electrodes: Ni
Base electrode layers
    Material for the base electrode layers: Electrodes including Cu and glass
    Thickness of the base electrode layers (a middle portion on the end surfaces): 10 μm
Plating layers
    Plating layers: Two-layer structure, a Ni plating layer and a Sn plating layer
    Thickness of the Ni plating layer: 3.5 μm
    Thickness of the Sn plating layer: 3.5 μm Comparative Example 2 includes multilayer ceramic capacitors with the specifications given below.
Chip size (design values): Length×width×height=0.245 mm×0.122 mm×0.120 mm
Material for the dielectric layers: CaZrO$_3$
Capacitance: 0.0001 μF
Rated voltage: 50 V
Material for the inner electrodes: Ni
Base electrode layers
    Material for the base electrode layers: Electrodes including Cu and glass
    Thickness of the base electrode layers (a middle portion on the end surfaces): 10 μm
Plating layers
    Plating layers: Two-layer structure, a Ni plating layer and a Sn plating layer
    Thickness of the Ni plating layer: 3.5 μm
    Thickness of the Sn plating layer: 3.5 μm Comparative Example 3 includes multilayer ceramic capacitors with the specifications given below.
Chip size (design values): Length×width×height=0.410 mm×0.210 mm×0.210 mm
Material for the dielectric layers: BaTiO$_3$
Capacitance: 0.1 μF
Rated voltage: 6.3 V
Material for the inner electrodes: Ni
Base electrode layers
    Material for the base electrode layers: Electrodes including Cu and glass
    Thickness of the base electrode layers (a middle portion on the end surfaces): 25 μm
Plating layers
    Plating layers: Two-layer structure, a Ni plating layer and a Sn plating layer
    Thickness of the Ni plating layer: 5.0 μm
    Thickness of the Sn plating layer: 4.5 μm Comparative Example 4 includes multilayer ceramic capacitors with the specifications given below.
Chip size (design values): Length×width×height=0.410 mm×0.210 mm×0.210 mm
Material for the dielectric layers: CaZrO$_3$
Capacitance: 0.0001 μF
Rated voltage: 50 V Material for the inner electrodes: Ni
Base electrode layers
    Material for the base electrode layers: Electrodes including Cu and glass
    Thickness of the base electrode layers (a middle portion on the end surfaces): 25 μm
Plating layers
    Plating layers: Two-layer structure, a Ni plating layer and a Sn plating layer
    Thickness of the Ni plating layer: 5.0 μm
    Thickness of the Sn plating layer: 4.5 μm Comparative Example 5 includes multilayer ceramic capacitors with the specifications given below.
Chip size (design values): Length×width×height=0.635 mm×0.338 mm×0.338 mm
Material for the dielectric layers: $BaTiO_3$
Capacitance: 1 μF
Rated voltage: 6.3 V
Material for the inner electrodes: Ni
Base electrode layers
    Material for the base electrode layers: Electrodes including Cu and glass
    Thickness of the base electrode layers (a middle portion on the end surfaces): 30 μm
Plating layers
    Plating layers: Two-layer structure, a Ni plating layer and a Sn plating layer
    Thickness of the Ni plating layer: 5.0 μm
    Thickness of the Sn plating layer: 4.5 μm Comparative Example 6 includes multilayer ceramic capacitors with the specifications given below.
Chip size (design values): Length×width×height=0.635 mm×0.338 mm×0.338 mm
Material for the dielectric layers: $CaZrO_3$
Capacitance: 0.0001 μF
Rated voltage: 50 V
Material for the inner electrodes: Ni
Base electrode layers
    Material for the base electrode layers: Electrodes including Cu and glass
    Thickness of the base electrode layers (a middle portion on the end surfaces): 30 μm
Plating layers
    Plating layers: Two-layer structure, a Ni plating layer and a Sn plating layer
    Thickness of the Ni plating layer: 5.0 μm
    Thickness of the Sn plating layer: 4.5 μm Comparative Example 7 includes multilayer ceramic capacitors with the specifications given below.
Chip size (design values): Length×width×height=3.450 mm×2.750 mm×2.750 mm
Material for the dielectric layers: $BaTiO_3$
Capacitance: 330 μF
Rated voltage: 4 V
Material for the inner electrodes: Ni
Base electrode layers
    Material for the base electrode layers: Electrodes including Cu and glass
    Thickness of the base electrode layers (a middle portion on the end surfaces): 85 μm
Plating layers
    Plating layers: Two-layer structure, a Ni plating layer and a Sn plating layer
    Thickness of the Ni plating layer: 4.0 μm
    Thickness of the Sn plating layer: 4.0 μm Comparative Example 8 includes multilayer ceramic capacitors with the specifications given below.
Chip size (design values): Length×width×height=3.450 mm×2.750 mm×2.750 mm
Material for the dielectric layers: $CaTiO_3$
Capacitance: 0.47 μF
Rated voltage: 6.3 V
Material for the inner electrodes: Ni
Base electrode layers
    Material for the base electrode layers: Electrodes including Cu and glass
    Thickness of the base electrode layers (a middle portion on the end surfaces): 85 μm
Plating layers
    Plating layers: Two-layer structure, a Ni plating layer and a Sn plating layer
    Thickness of the Ni plating layer: 4.0 μm
    Thickness of the Sn plating layer: 4.0 μm The ESR values at measurement frequencies of about 1 MHz, about 10 MHz, and about 50 MHz were measured by heating the multilayer ceramic capacitors in an air atmosphere at about 150° C. for about 1 hour before the measurement, mounting the capacitors onto a substrate for measurement, and then measuring the resistance of the capacitors using a network analyzer at 24±2 hours after the completion of heating.

The ESR values at measurement frequencies of about 500 MHz and about 1 GHz were measured by gauging the resistance of the chips alone by an impedance analyzer.

The dimensions of the multilayer body, i.e., dimension L, dimension W, and dimension T, were measured as follows: Dimension W was measured at about ½L by a point micrometer. Dimension L and dimension T were measured by grinding the chip to expose a cross section parallel to the LT plane at about ½W and observing the cross section by a microscope.

The volume was calculated by multiplying dimension L, dimension W, and dimension T measured as above (L×W×T).

The upsizing factor was measured for each measurement frequency, by dividing the volume of the multilayer body of an Example by the volume of the multilayer body of the Comparative Example with a same or similar measurement frequency.

In each of Examples 1 to 8 and Comparative Examples 1 to 8, ten samples were prepared for the measurement of ESR and another ten for the calculation of the upsizing factor.

The measured ESR, measured dimensions of the multilayer body, and volume of the multilayer body for each of Examples and Comparative Examples and calculated upsizing factors are presented in Table 1.

TABLE 1

| | Frequency | ESR (mΩ) | Dimensions of the multilayer body (mm) | | | Volume (mm³) L × W × T | Upsizing factor |
|---|---|---|---|---|---|---|---|
| | | | L | W | T | | |
| Comparative Example 1 | 500 MHz | 280 | 0.186 | 0.0910 | 0.0910 | 0.00154 | — |
| Example 1 | | 140 | 0.216 | 0.101 | 0.101 | 0.00220 | 1.43 |
| Comparative Example 2 | 1 GHz | 400 | 0.186 | 0.091 | 0.0910 | 0.00154 | — |
| Example 2 | | 200 | 0.216 | 0.101 | 0.101 | 0.00220 | 1.43 |
| Comparative Example 3 | 50 MHz | 140 | 0.317 | 0.167 | 0.167 | 0.00884 | — |
| Example 3 | | 70 | 0.357 | 0.187 | 0.187 | 0.01248 | 1.41 |
| Comparative Example 4 | 1 GHz | 240 | 0.317 | 0.167 | 0.167 | 0.00884 | — |
| Example 4 | | 120 | 0.357 | 0.187 | 0.187 | 0.0125 | 1.41 |
| Comparative Example 5 | 10 MHz | 12 | 0.539 | 0.286 | 0.288 | 0.0444 | — |
| Example 5 | | 6 | 0.579 | 0.306 | 0.308 | 0.0546 | 1.23 |
| Comparative Example 6 | 1 GHz | 400 | 0.539 | 0.286 | 0.288 | 0.0444 | — |
| Example 6 | | 200 | 0.579 | 0.306 | 0.308 | 0.0546 | 1.23 |
| Comparative Example 7 | 1 MHz | 12 | 3.149 | 2.595 | 2.60 | 21.2 | — |
| Example 7 | | 6 | 3.249 | 2.635 | 2.64 | 22.6 | 1.06 |
| Comparative Example 8 | 1 MHz | 0.4 | 3.149 | 2.595 | 2.60 | 21.2 | — |
| Example 8 | | 0.2 | 3.249 | 2.635 | 2.64 | 22.6 | 1.06 |

The results of the measurement of ESR are discussed below. The measured ESR values of Examples 1 to 8 were compared with those of Comparative Examples 1 to 8 for each measurement frequency, and the ESR of the multilayer ceramic capacitors of the Example(s) was approximately half of the ESR of the corresponding Comparative Example(s) for all measurement frequencies.

The upsizing factor, for the multilayer body in Examples as compared the Comparative Examples of a same or substantially a same measurement frequency, is discussed below. The upsizing factor exceeded 1 across all measurement frequencies, ranging from about 1.06 to about 1.43. Accordingly, the design dimensions of the multilayer body were able to be increased. These results indicate that multilayer ceramic capacitors according to preferred embodiments of the present invention are able to be designed for a high capacitance.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A multilayer ceramic capacitor comprising:
a multilayer body including:
  a stack of a plurality of dielectric layers;
  first and second primary surfaces opposite to each other in a direction of stacking;
  first and second lateral surfaces opposite to each other in a width direction that is perpendicular or substantially perpendicular to the direction of stacking; and
  first and second end surfaces opposite to each other in a length direction that is perpendicular or substantially perpendicular to the direction of stacking and width direction;
first inner electrodes and second inner electrodes stacked alternately with the plurality of dielectric layers therebetween, each of the first inner electrodes including an exposed portion on the first end surface and each of the second inner electrodes including an exposed portion on the second end surface;
a first outer electrode electrically coupled to the first inner electrodes and located on a first end surface side, and a second outer electrode electrically coupled to the second inner electrodes and located on a second end surface side; wherein
the first outer electrode includes a first base electrode layer including electroconductive metal and glass components, a first electroconductive resin layer including thermosetting resin and metal components, and a first plating layer;
the second outer electrode includes a second base electrode layer including electroconductive metal and glass components, a second electroconductive resin layer including thermosetting resin and metal components, and a second plating layer;
the first base electrode layer is only located on a surface of the first end surface, and the second base electrode layer is only located on a surface of the second end surface;
the first electroconductive resin layer extends, to be connected to the first base electrode layer, from an end portion of the first base electrode layer to portions of surfaces of the first and second primary surfaces and portions of surfaces of the first and second lateral surfaces;
the second electroconductive resin layer extends, to be connected to the second base electrode layer, from an end portion of the first base electrode layer to portions of surfaces of the first and second primary surfaces and portions of surfaces of the first and second lateral surfaces;
the first plating layer is located on a surface of the first base electrode layer and a surface of the first electroconductive resin layer; and
the second plating layer is located on a surface of the second base electrode layer and a surface of the second electroconductive resin layer.

2. The multilayer ceramic capacitor according to claim 1, wherein:
- the first base electrode layer covers at least the exposed portions of the first inner electrodes, and the second base electrode layer covers at least the exposed portions of the second inner electrodes; and
- the first electroconductive resin layer extends, to be connected to the first base electrode layer, from an end portion of the exposed portions of the first inner electrodes, exposed on the first end surface, to portions of the surfaces of the first and second primary surfaces and portions of the surfaces of the first and second lateral surfaces; and
- the second electroconductive resin layer extends, to be connected to the second base electrode layer, from an end portion of the exposed portions of the second inner electrodes, exposed on the second end surface, to portions of the surfaces of the first and second primary surfaces and portions of the surfaces of the first and second lateral surfaces.

3. The multilayer ceramic capacitor according to claim 1, wherein the multilayer body has a rectangular-parallelepiped shape or a substantially rectangular-parallelepiped shape.

4. The multilayer ceramic capacitor according to claim 1, wherein each of the plurality of dielectric layers includes a dielectric ceramic material.

5. The multilayer ceramic capacitor according to claim 1, wherein a thickness of each of the plurality of dielectric layers after firing is between about 0.4 μm and about 20 μm.

6. The multilayer ceramic capacitor according to claim 1, wherein a number of the plurality of dielectric layers is between about 20 and about 2000 layers.

7. The multilayer ceramic capacitor according to claim 1, wherein each of the first inner electrodes and the second inner electrodes includes dielectric particles and a metal or a metal alloy.

8. The multilayer ceramic capacitor according to claim 1, wherein a thickness of each of the first inner electrodes and the second inner electrodes is between about 0.2 μm and about 2.0 μm.

9. The multilayer ceramic capacitor according to claim 1, wherein a total number of the first inner electrodes and the second inner electrodes is between about 2 and about 1600 or less.

10. The multilayer ceramic capacitor according to claim 1, wherein a percentage of an area of each of the plurality of dielectric layers that covered by one of the first inner electrodes or the second inner electrodes is between about 50% and about 100%.

11. The multilayer ceramic capacitor according to claim 1, wherein an electrostatic capacitance is defined between each of the first inner electrodes and each of the second inner electrodes.

12. The multilayer ceramic capacitor according to claim 1, wherein corner and edge portions of the multilayer body are rounded.

13. The multilayer ceramic capacitor according to claim 11, wherein the first electroconductive resin layer and the second electroconductive resin layer overlap with the surfaces of any portions of the first base electrode layer and second base electrode layer that reach the corners and edge portions.

14. The multilayer ceramic capacitor according to claim 1, wherein the thermosetting resin is an epoxy resin.

15. The multilayer ceramic capacitor according to claim 1, wherein each of the first electroconductive resin layer and the second electroconductive resin layer includes a curing agent.

16. The multilayer ceramic capacitor according to claim 1, wherein a volume of the metal components included in each of the first electroconductive resin layer and the second electroconductive resin layer is between about 35 vol % and about 75 vol % of a total volume of each of the first electroconductive resin layer and the second electroconductive resin layer.

17. The multilayer ceramic capacitor according to claim 1, wherein the metal components of each of the first electroconductive resin layer and the second electroconductive resin layer have a metal with a spherical or substantially spherical shape or a metal with a flat shape.

18. The multilayer ceramic capacitor according to claim 1, wherein the metal components of each of the first electroconductive resin layer and the second electroconductive resin layer include two different metal components.

19. The multilayer ceramic capacitor according to claim 18, wherein the two different metal components include a first metal component of Sn or an alloy including Sn and a second metal component of Cu, Ag, Pd, Pt, Au, an alloy including Cu, an alloy including Ag, an alloy including Pd, an alloy including Pt, or an alloy including Au.

20. The multilayer ceramic capacitor according to claim 1, wherein each of the first plating layer and the second plating layer includes a multilayer structure including a Ni layer and a Sn layer.

* * * * *